(12) United States Patent
Yang

(10) Patent No.: US 12,022,798 B2
(45) Date of Patent: Jul. 2, 2024

(54) PET CARRIER STROLLER

(71) Applicant: Yung-Chuan Yang, Tainan (TW)

(72) Inventor: Yung-Chuan Yang, Tainan (TW)

( * ) Notice: Subject to any disclaimer, the term of this patent is extended or adjusted under 35 U.S.C. 154(b) by 152 days.

(21) Appl. No.: 17/660,225

(22) Filed: Apr. 22, 2022

(65) Prior Publication Data

US 2023/0337624 A1 Oct. 26, 2023

(51) Int. Cl.
A01K 1/02 (2006.01)

(52) U.S. Cl.
CPC .................................. A01K 1/0254 (2013.01)

(58) Field of Classification Search
CPC .... A01K 1/0254; A01K 1/0272; B62B 7/142; B62B 2205/20; B62B 9/102; B62B 9/00; B62B 7/14; B62B 2202/42; B60N 2/2848; B60N 2/2821; B60N 2/28; A47D 1/10
USPC ...................... 119/496; 280/650, 658, 47.25; 297/256.16, 130
See application file for complete search history.

(56) References Cited

U.S. PATENT DOCUMENTS

| 5,947,555 | A  | * | 9/1999 | Welsh, Jr. | ............... | B62B 7/142 |
| | | | | | | 280/30 |
| 6,866,008 | B1 | * | 3/2005 | Havard | ..................... | B62B 7/00 |
| | | | | | | 280/47.38 |
| 11,001,289 | B2 | * | 5/2021 | Gibson | .................. | B62B 7/008 |
| 2006/0169218 | A1 | * | 8/2006 | Chang | ................. | A01K 1/0236 |
| | | | | | | 119/496 |
| 2010/0025968 | A1 | * | 2/2010 | Fritz | ......................... | B62B 7/08 |
| | | | | | | 280/647 |
| 2014/0230747 | A1 | * | 8/2014 | Jakubowski | .............. | B62B 9/26 |
| | | | | | | 119/496 |
| 2019/0053462 | A1 | * | 2/2019 | Lin | ...................... | A01K 1/0236 |
| 2019/0313597 | A1 | * | 10/2019 | Chen | ..................... | A01K 1/0254 |
| 2020/0296919 | A1 | * | 9/2020 | Jakubowski | ......... | A01K 1/0245 |
| 2021/0078462 | A1 | * | 3/2021 | Cheng | ................. | B60N 2/2821 |
| 2023/0217891 | A1 | * | 7/2023 | Xiang | ...................... | B62B 7/06 |
| | | | | | | 119/453 |

* cited by examiner

Primary Examiner — Joshua J Michener
Assistant Examiner — Nicole Paige MacCrate
(74) Attorney, Agent, or Firm — Rosenberg, Klein & Lee

(57) ABSTRACT

A pet carrier stroller is revealed. The pet carrier stroller mainly includes a seat cushion with two support rods, a pet carrier bag connected with the seat cushion, and a stroller. While in use, the seat cushion together with the pet carrier bag having a pet therein is disposed on a mounting frame of the stroller. Then the pet carrier bag is arranged at the stroller firmly by anchor members of the two support rods of the seat cushion connected and fastened with fastening portions of the mounting frame of the stroller correspondingly so that safety of pets travelled in the stroller is improved. Moreover, the seat cushion and the stroller are disconnected. Then a front-wheel support and a rear-wheel support of the stroller are pulled together toward each other for reducing space occupied and convenient storage.

8 Claims, 9 Drawing Sheets

PET CARRIER STROLLER

BACKGROUND OF THE INVENTION

Field of the Invention

The present invention relates to a pet carrier stroller, especially to a pet carrier stroller which includes a pet carrier bag firmly mounted on a stroller. Thus safety of pets wheeled in the stroller is improved and the stroller is easily collapsible for compact storage.

Description of Related Art

When pet owners intend to take their pets for a walk or to go shopping, they usually use strollers to carry the pets for reducing a heavy load on their shoulders or hands while carrying a pet carrier bag. The pet can also sit in the stroller stably. However, a container for mounting pets therein of a pet stroller available now is fixed on the stroller. Thus the pet owners need to take the pet out of the pet carrier bag and then place the pet into the pet container of the stroller. This cause trouble and inconvenience to pet owners.

SUMMARY OF THE INVENTION

Therefore, it is a primary object of the present invention to provide a pet carrier stroller in which a pet carrier bag is arranged at a stroller firmly so as to improve safety of pets transported in the stroller. Moreover, the stroller is collapsible for easy storage.

In order to achieve the above object, a pet carrier stroller according to the present invention is mainly composed of a seat cushion having two support rods, a pet carrier bag connected with the seat cushion, and a stroller. Both the seat cushion and the pet carrier bag with a pet mounted therein are disposed on a mounting frame of the stroller while in use. Then the pet carrier bag is arranged at the stroller firmly by anchor members of the two support rods of the seat cushion connected and fastened with fastening portions of the mounting frame of the stroller correspondingly so that safety of pets sitting in the stroller is improved. Moreover, the seat cushion is able to be detached from the stroller while not in use. Then a front-wheel support and a rear-wheel support of the stroller are pulled together toward each other for space saving and convenient storage.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Refer to FIG. 1-4, a pet carrier stroller according to the present invention mainly includes a seat cushion 1, a pet carrier bag 2, and a stroller 3.

Figure 1:
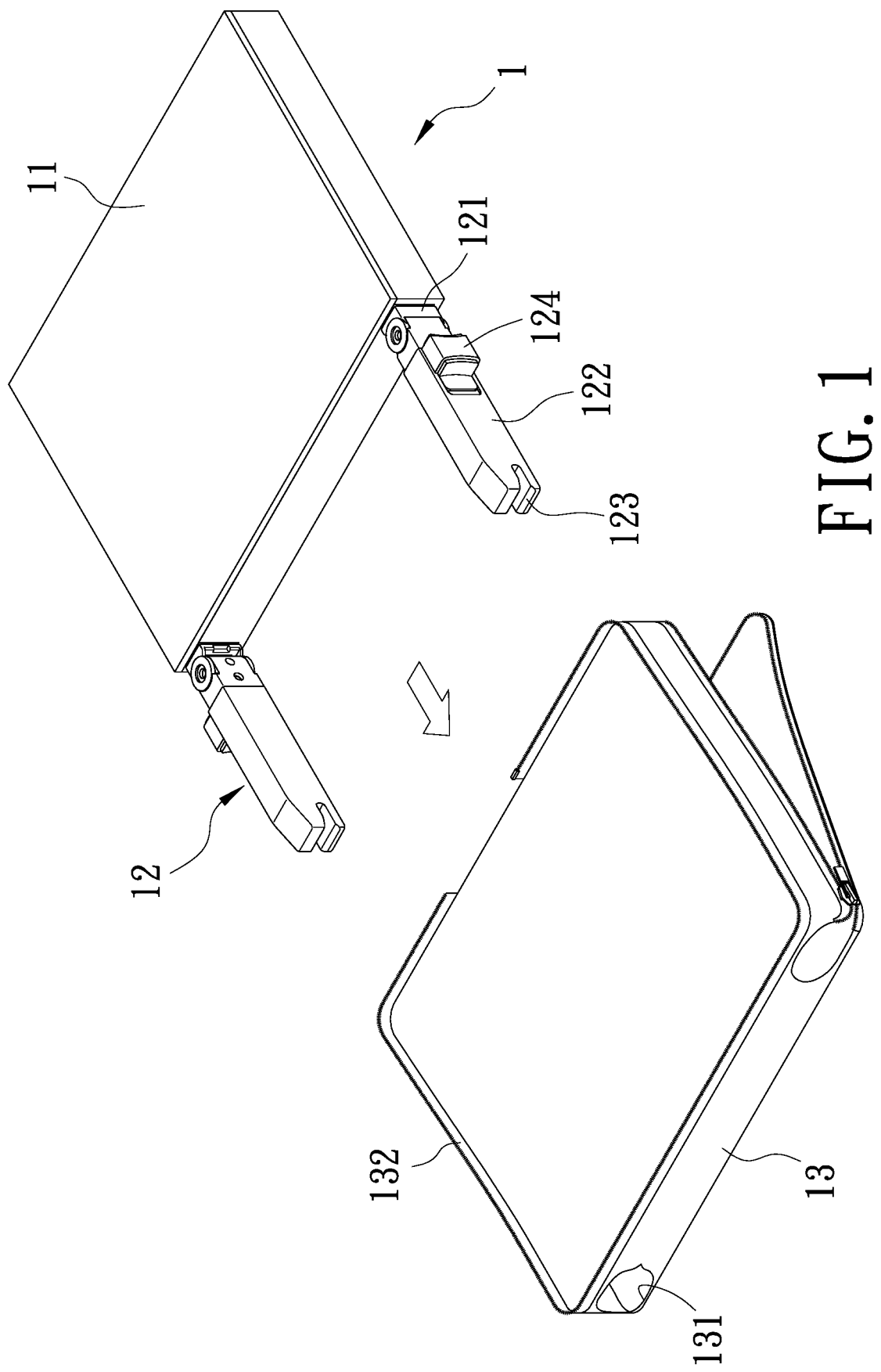
FIG. 1 is an exploded view of a seat cushion of an embodiment according to the present invention.

As shown in FIG. 1, the seat cushion 1 consists of a pad body 11, two support rods 12 projecting from one side of the pad body 11, and a seat cushion cover 13. The support rod 12 is composed of an assembly portion 121 disposed on the pad body 11, a working rod 122 having one end pivotally connected to the assembly portion 121, an anchor member 123 arranged at the other end of the working rod 122, and an operating member 124 mounted to a lateral surface of the working rod 122 for control of on/off of the anchor member 123 and by which the anchor member 123 is linked and actuated. The pad body 11 is enclosed in the seat cushion cover 13 which includes two through holes 131 on one side thereof and at least one first connecting member 132 disposed around an upper end thereof. The two support rods 12 are protruding from the two through holes 131 of the seat cushion cover 13 correspondingly.

Figure 2:
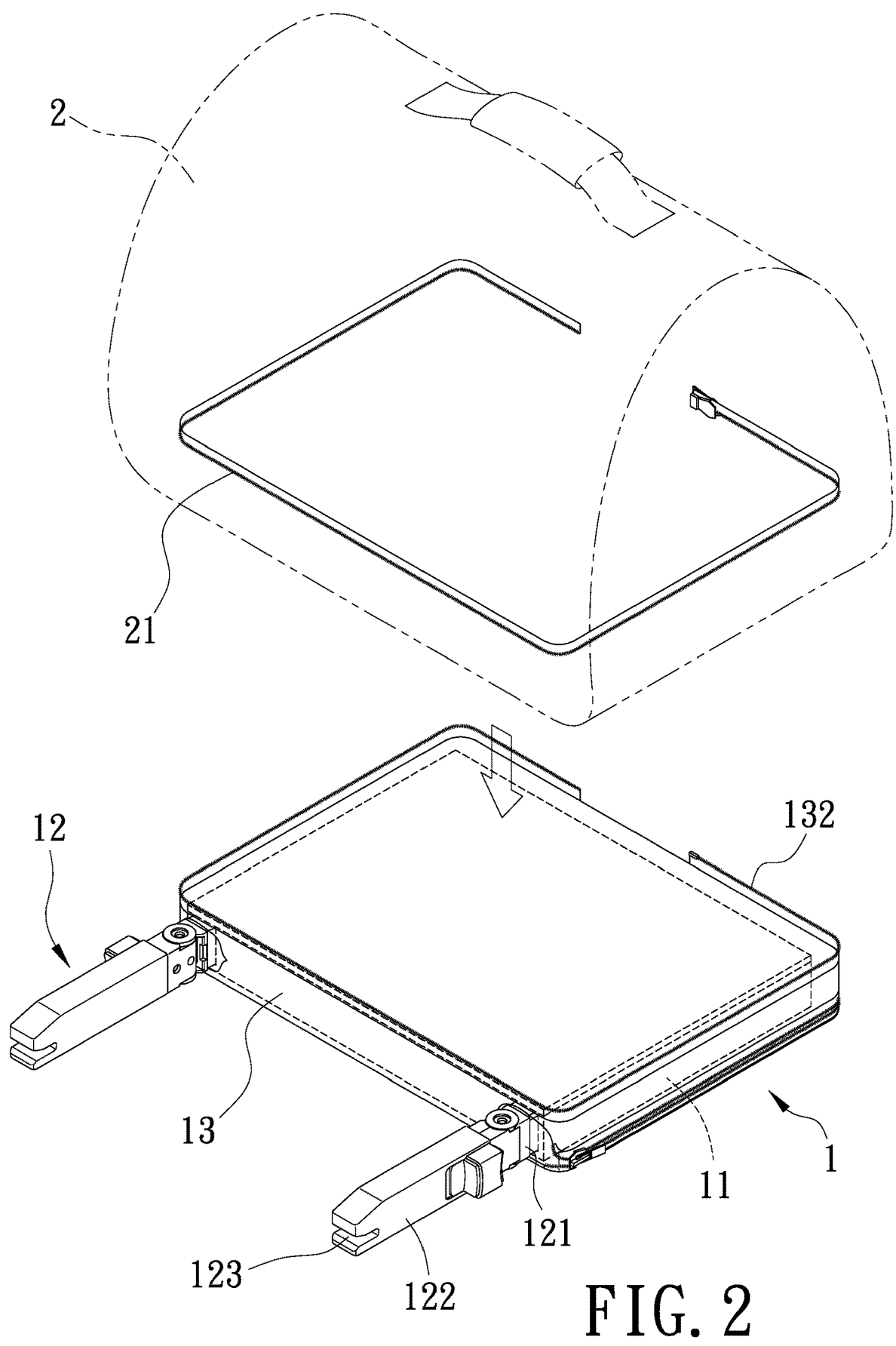
FIG. 2 is a perspective view of a seat cushion and a pet carrier bag separated from each other of an embodiment according to the present invention.
Figure 3:
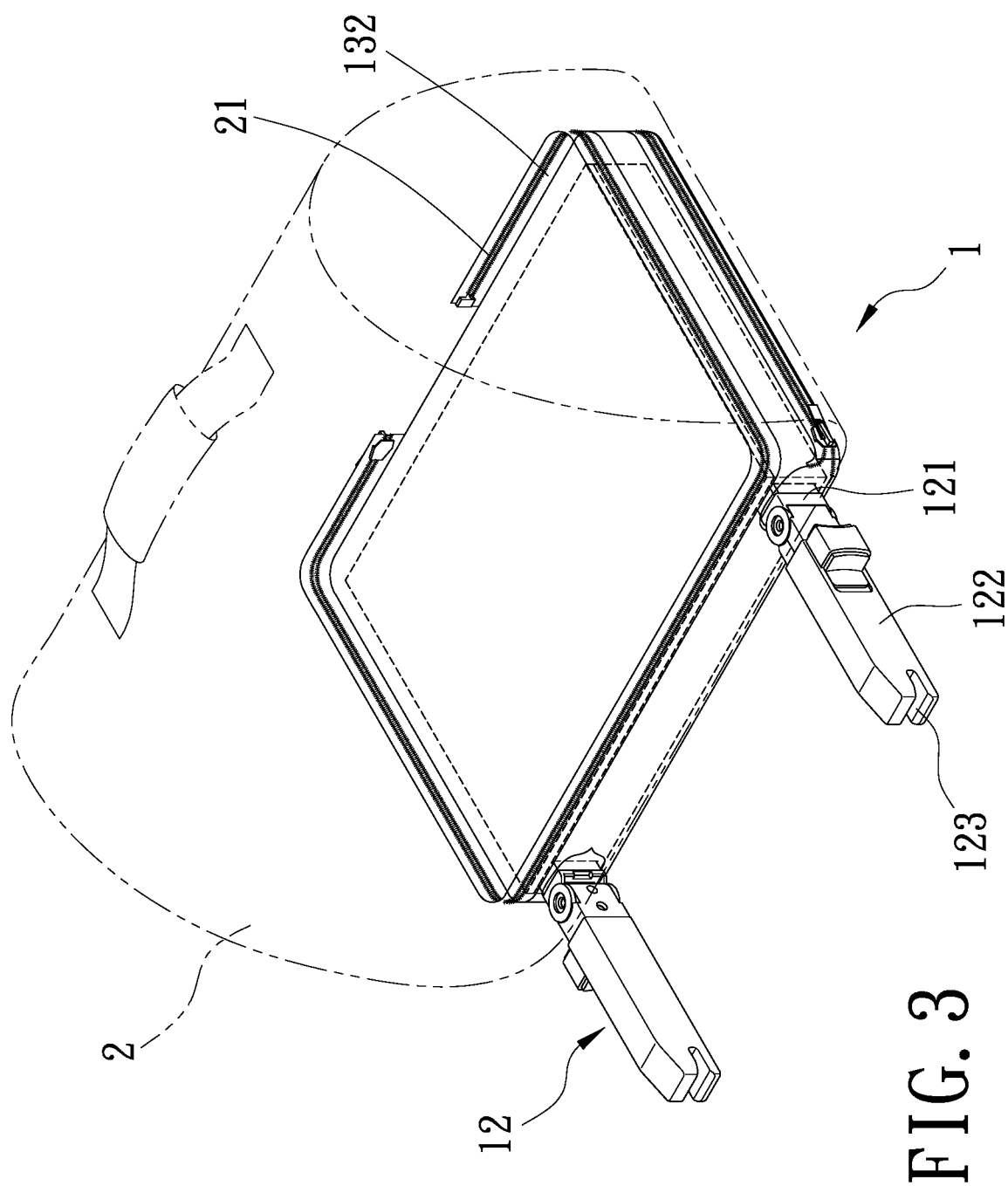
FIG. 3 is a perspective view of a seat cushion and a pet carrier bag connected with each other of an embodiment according to the present invention.

Refer to FIG. 2 and FIG. 3, the pet carrier bag 2 is mounted on the seat cushion cover 13 of the seat cushion 1 and provided with at least one second connecting member 21 which is arranged at a periphery of a bottom end of the pet carrier bag 2 and connected with the first connecting member 132 on the upper end of the seat cushion cover 13. The first connecting member 132 and the second connecting member 21 can be zippers, hook-and-loop fasteners, or male and female interlocking elements (a snap fastener).

Figure 4:
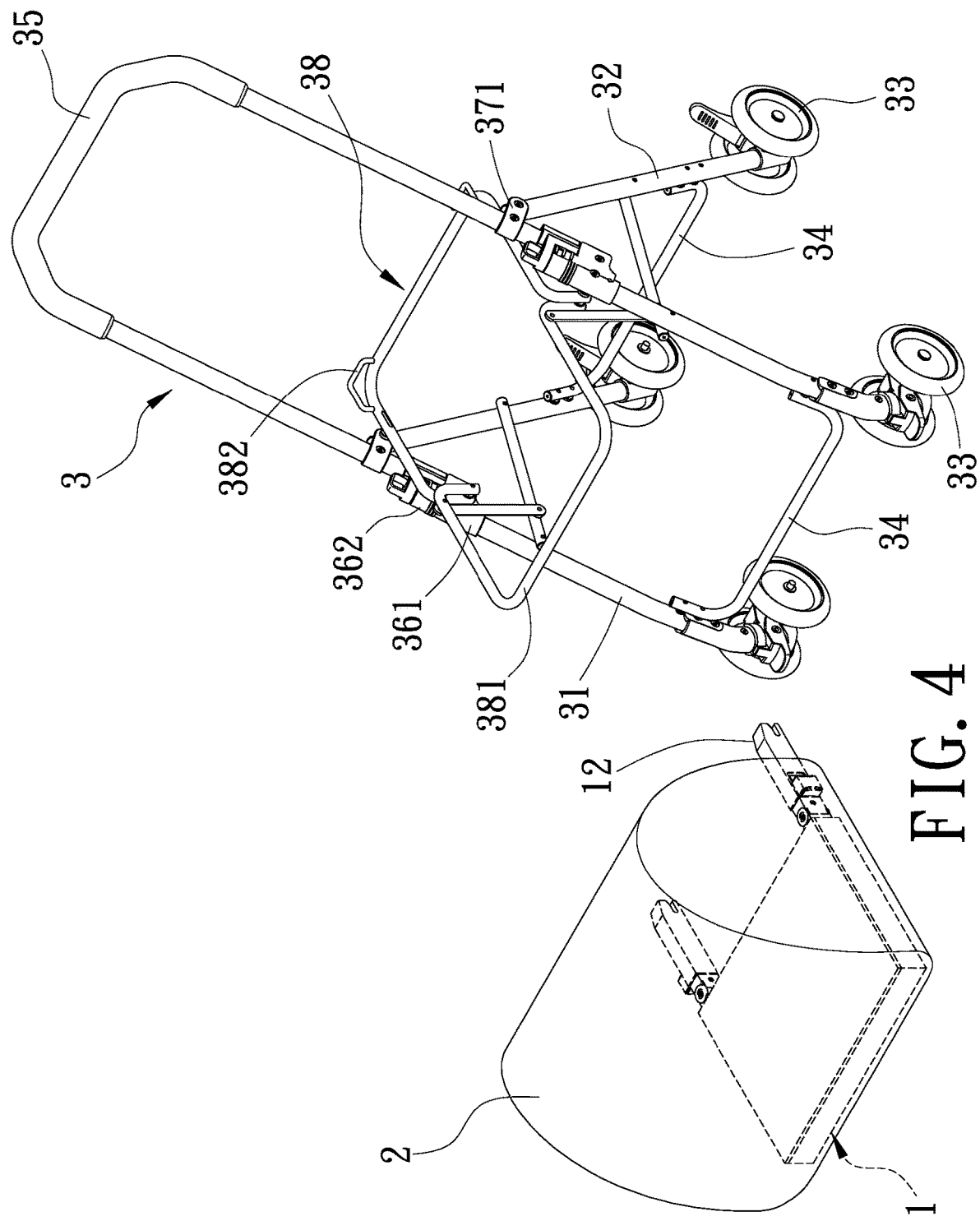
FIG. 4 is an exploded view of an embodiment according to the present invention.
Figure 5:
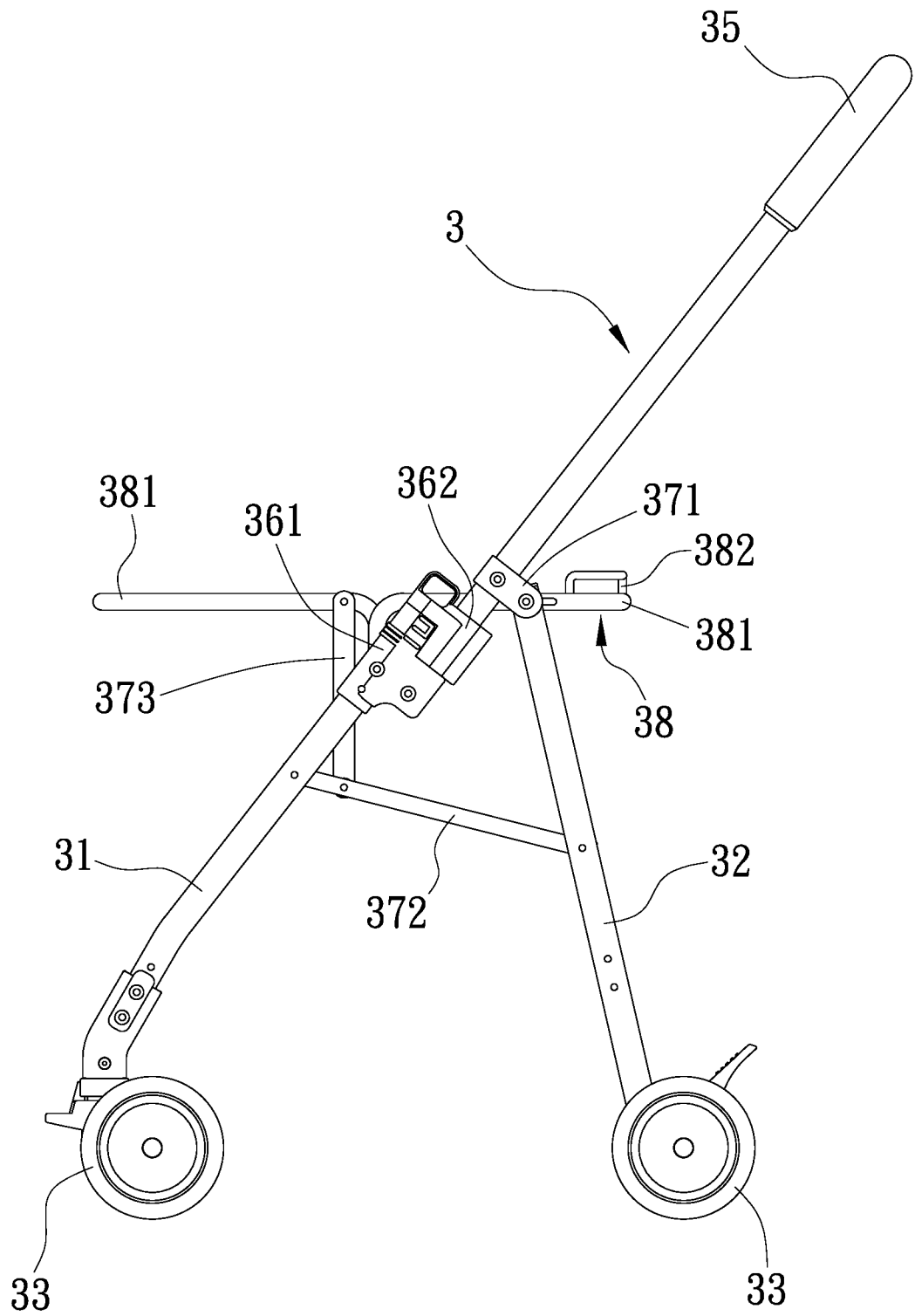
FIG. 5 is a front view of a stroller of an embodiment according to the present invention.
Figure 6:
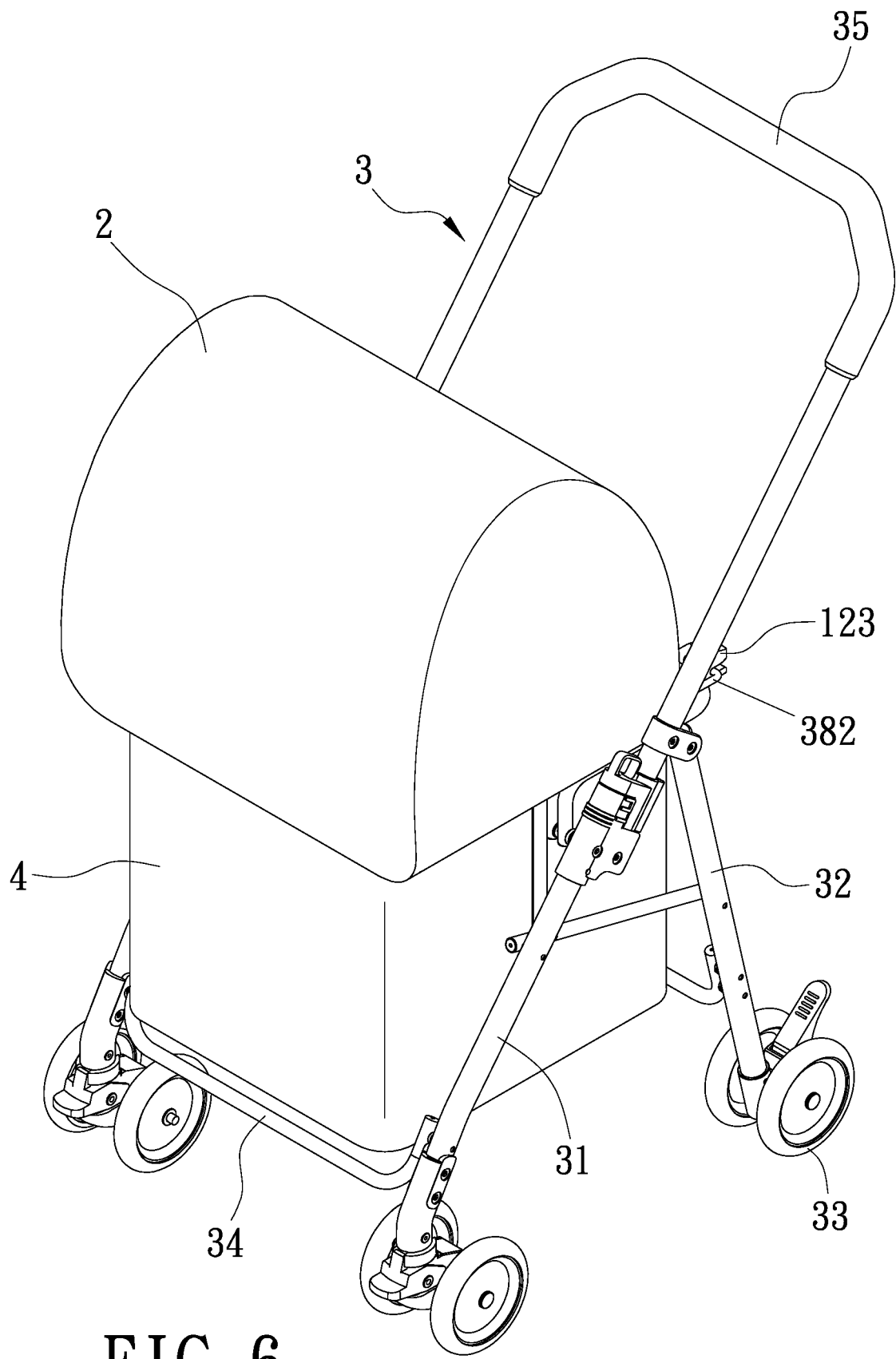
FIG. 6 is a perspective view of an embodiment in use according to the present invention.

Refer to FIG. 4, FIG. 5, and FIG. 6, the stroller 3 is composed of a front-wheel support 31, a rear-wheel support 32, at least one wheel 33 arranged at both left and right sides of a bottom end of the front-wheel support 31 and the rear-wheel support 32, at least one object receiving portion 34 arranged adjacent to and above both the bottom end of the front-wheel support 31 and the bottom end of the rear-wheel support 32, a handle support 35 disposed between the front-wheel support 31 and the rear-wheel support 32, and a mounting frame 38 arranged over the front-wheel support 31 and the rear-wheel support 32. The front-wheel support 31 and the rear-wheel support 32 are disposed obliquely and opposite to each other. A first pivot 361 is mounted to a bottom end of both left and right sides of the handle support 35 while a second pivot 362 is arranged at left and right sides of a top end of the front-wheel support 31. The two first pivots 361 are pivotally connected with the two second pivots 362 correspondingly. A left side and a right side of a top end of the rear-wheel support 32 and the left side and the right side of the handle support 35 are connected by two first connection parts 371 correspondingly. The mounting frame 38 consists of two frames 381 arranged at a front side and a rear side of the pet carrier stroller correspondingly and opposite to each other, and two fastening portions 382 disposed on a rear side of the rear-side frame 381. An intersection of rear ends of left and right sides of the two frames 381 is pivotally connected with the respective second pivots 362 arranged at the top end of the front-wheel support 31 correspondingly. A second connection part 372 is pivotally connected with the left side of the front-wheel support 31 and left right side of the rear-wheel support 32 as well as the right side of the front-wheel support 31 and the right side of the rear-wheel support 32 and located under the handle support 35. The left and right sides of the front-side frame 381 and the two second connection parts 372 are pivotally connected with two third connection parts 373 correspondingly.

While in use, the pet carrier bag 2 is disposed on the seat cushion cover 13 of the seat cushion 1 and the second connecting member 21 on the periphery of the bottom end of the pet carrier bag 2 is connected with the first connecting member 132 on the upper end of the seat cushion cover 13. Then at least one pet such as a cat or a dog is placed into the pet carrier bag 2.

Refer to FIG. 6, when users intend to carry their pets with them for a walk or shopping by the stroller 3, the seat cushion 1 together with the pet carrier bag 2 having the pet therein is disposed on the mounting frame 38 of the stroller 3. Then the anchor members 123 of the two support rods 12 of the seat cushion 1 are connected and fastened with the two fastening portions 382 on the rear-side frame 381 of the mounting frame 38 correspondingly to connect the seat cushion 1 with the mounting frame 38 of the stroller 3 firmly. Moreover, a bag 4 for mounting pet supplies is arranged at the object receiving portions 34 adjacent to the bottom ends of the front-wheel support 31 and the rear-wheel support 32. Thereby the user can hold the handle support 35 of the stroller 3 by his/her hands for pushing the stroller 3 to move. Since the seat cushion 1 and the stroller 3 are connected firmly, the pet carrier bag 2 connected with the seat cushion 1 is also arranged at the stroller 3 stably, without shaking, sliding on the stroller 3, or even falling down from the stroller 3. Therefore, the safety of pets sitting in the stroller 3 is improved.

Figure 7:
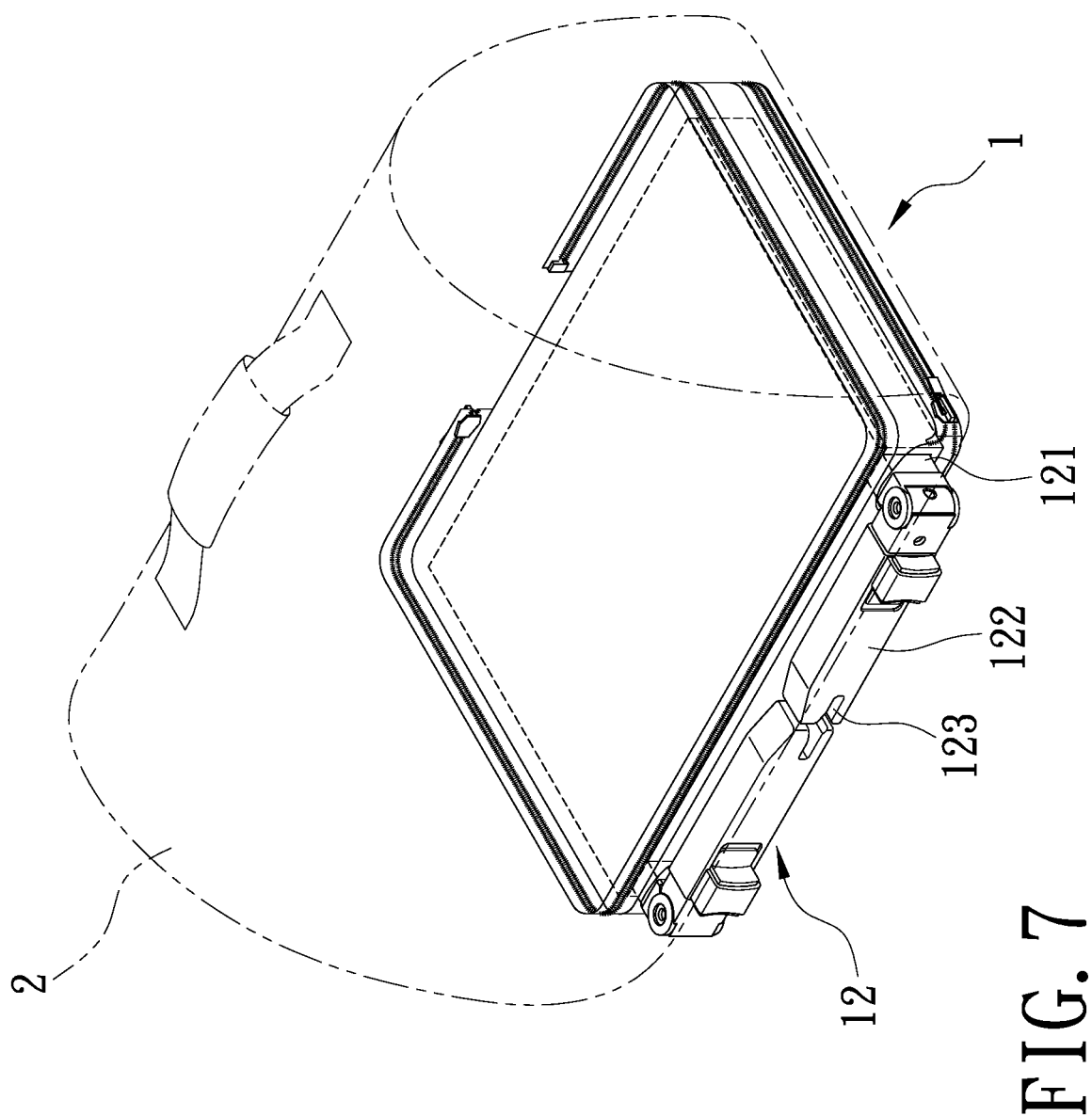
FIG. 7 is a schematic drawing showing a seat cushion in a folded state of an embodiment according to the present invention.
Figure 8:
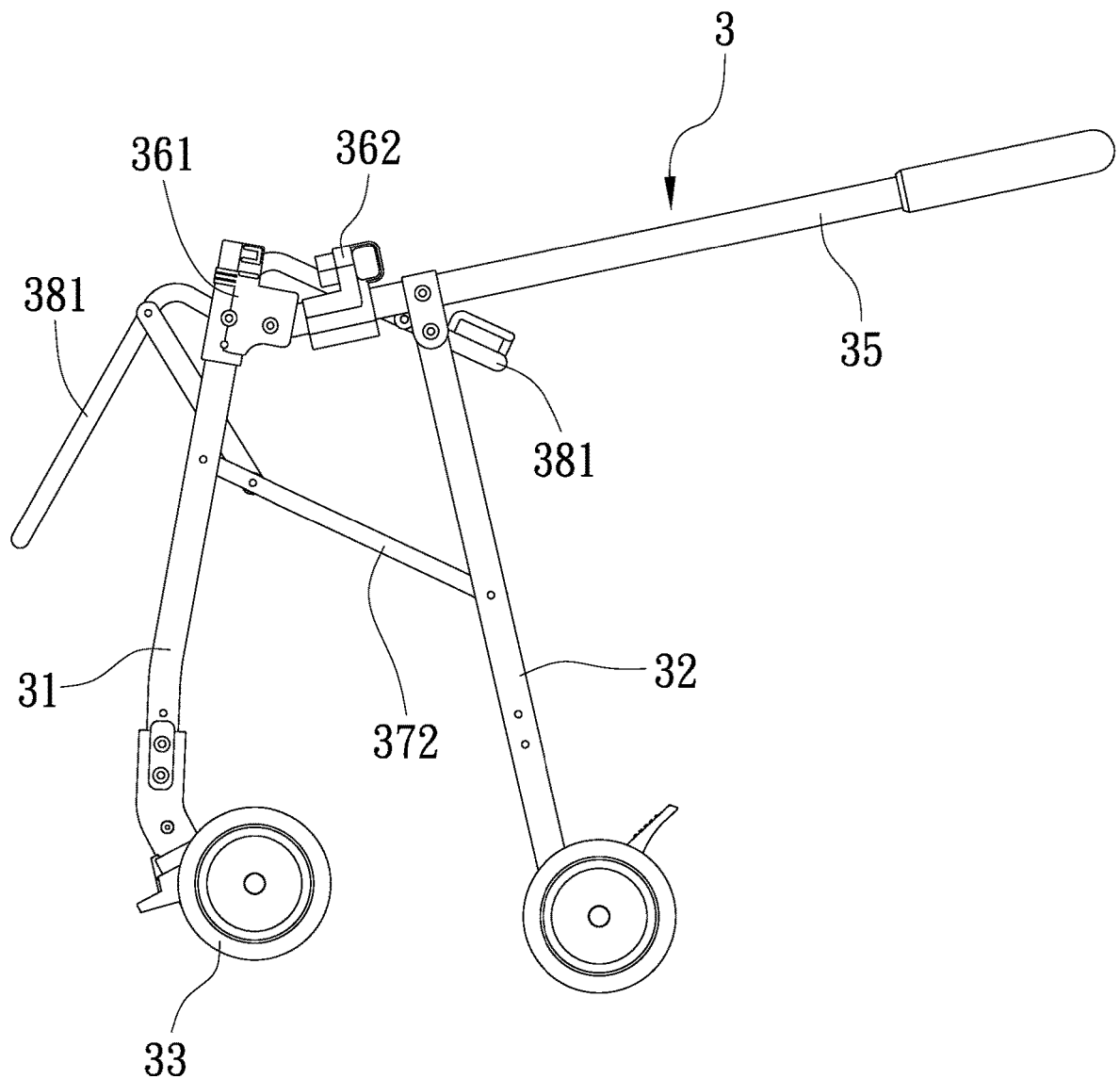
FIG. 8 is a schematic drawing showing folding of a stroller of an embodiment according to the present invention.
Figure 9:
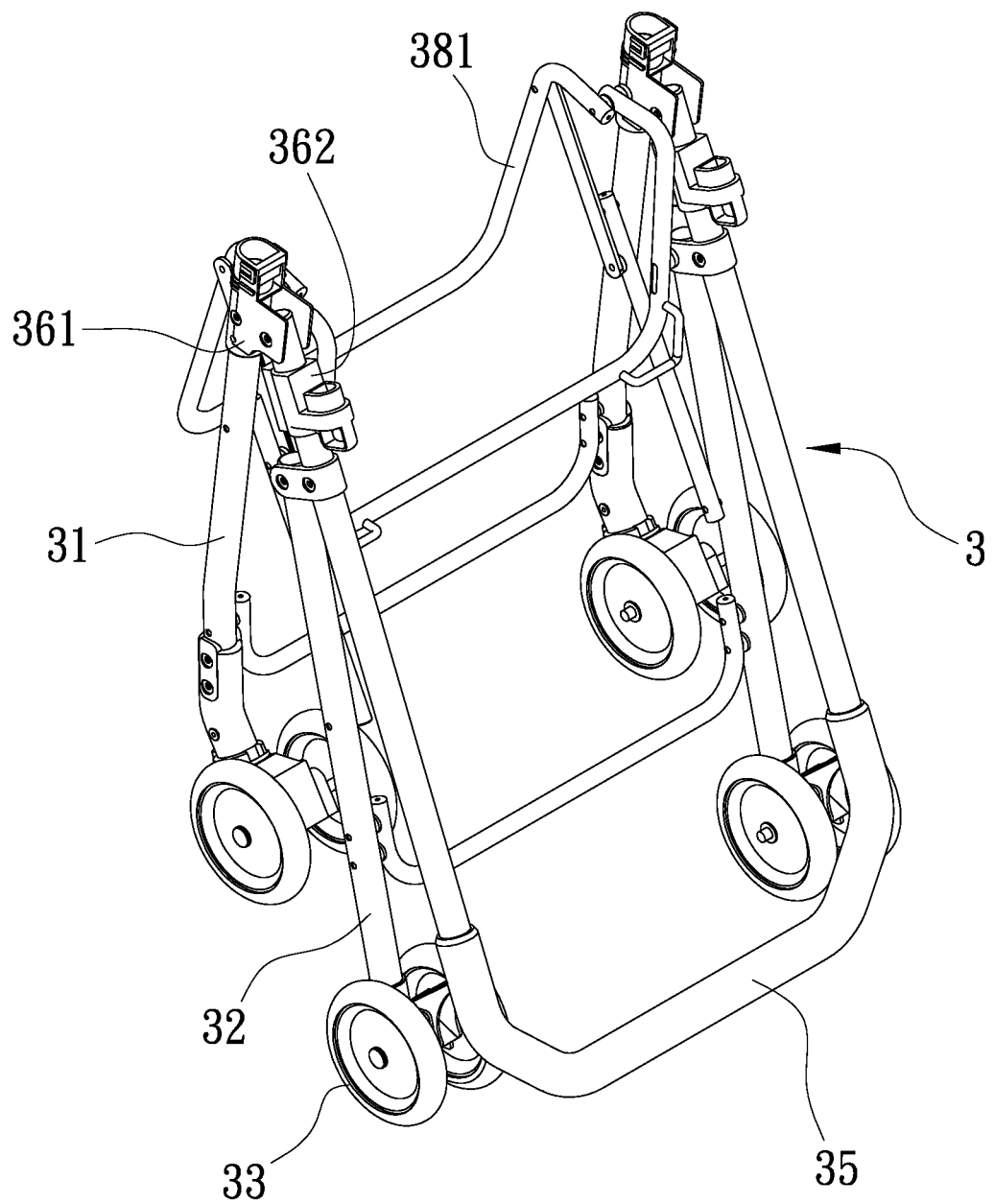
FIG. 9 is a perspective view of a stroller already being folded of an embodiment according to the present invention.

The user can also carry the seat cushion 1 together with the pet carrier bag 2 having the pet therein by their hands without using the stroller 3. Refer to FIG. 7, the working rods 122 of the two support rods 12 of the seat cushion 1 are folded inward to be against one side of the seat cushion 1 for reducing space occupied by the seat cushion 1. Thereby the user can carry the seat cushion 1 together with the pet carrier bag 2 more conveniently. As shown in FIG. 8 and FIG. 9, when the stroller 3 is not in use, the handle support 35 of the stroller 3 is folded back down and the rear-wheel support 32 pivotally connected with the handle support 35 is also driven to move forward. Thus the front-wheel support 31, the rear-wheel support 32, and the handle support 35 are pulled together toward each other for storage. Moreover, the front-side and rear-side frames 381 of the mounting frame 38 are moved down toward each other. Therefore, the space occupied by the stroller 3 is significantly reduced so that the stroller 3 is more convenient to store in a car trunk or indoor corners.

In summary, the present invention has the following advantages:
1. In the present pet carrier stroller, the seat cushion is fastened with the stroller firmly so that the pet in the pet carrier bag connected with the seat cushion can sit in the stroller stably and the safety of the pet transported in the stroller is improved.
2. The two support rods of the seat cushion can be folded inward to reduce space occupied by the seat cushion. Thereby users can carry the seat cushion together with the pet carrier bag having the pet therein by their hands more conveniently.
3. While the stroller is not in use, the handle support is folded back down and then the front-wheel support, the rear-wheel support, and the handle support are pulled together toward each other for storage. Thereby the space occupied by the stroller is minimized and the stroller is more convenient to store.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A pet carrier stroller comprising:
a seat cushion provided with at least one first connecting member disposed around an upper end of the seat cushion and two support rods each of which are projecting from one side of the seat cushion and having an anchor member arranged at one end of the support rod, the seat cushion further including:
a pad body and the two support rods project from one side of the pad body, and
a seat cushion cover provided with two through holes on one side thereof, wherein the pad body is enclosed in the seat cushion cover and the two support rods protrude from the two through holes of the seat cushion cover correspondingly, and the at least one first connecting member is disposed around an upper end of the seat cushion cover;
a pet carrier bag which includes at least one second connecting member arranged at a bottom end of the pet carrier bag and able to be connected or disconnected with the first connecting member on the upper end of the seat cushion; and
a stroller provided with a mounting frame which is used for mounting the seat cushion thereon and provided with two fastening portions arranged at one side of the mounting frame for connection or disconnection with the anchor members of the two support rods of the seat cushion correspondingly.

2. The pet carrier stroller as claimed in claim 1, wherein the support rod of the seat cushion includes an assembly portion disposed on the seat cushion and a working rod having one end pivotally connected to the assembly portion and the other end provided with the anchor member.

3. The pet carrier stroller as claimed in claim 1, wherein the support rod of the seat cushion is provided with an operating member by which the anchor member of the support rod is linked and actuated.

4. The pet carrier stroller as claimed in claim 1, wherein the stroller includes a front-wheel support and a rear-wheel support disposed obliquely and opposite to each other, at least one wheel arranged at each of two sides of a bottom end of both the front-wheel support and the rear-wheel support, and a handle support disposed between the front-wheel support and the rear-wheel support; wherein a first pivot is mounted to a bottom end of two sides of the handle support while a second pivot is arranged at two sides of a top end of the front-wheel support and the two first pivots are pivotally connected with the two second pivots correspondingly; two sides of a top end of the rear-wheel support and the two sides of the handle support are connected by two first connection parts correspondingly; wherein the mounting frame is arranged over both the front-wheel support and the rear-wheel support and two sides of the mounting frame are pivotally connected with the two second pivots correspondingly.

5. The pet carrier stroller as claimed in claim 4, wherein the mounting frame of the stroller includes two frames arranged at a front side and a rear side of the pet carrier stroller correspondingly and opposite to each other; an intersection of rear ends of two sides of the two frames is pivotally connected with the two second pivots correspondingly and the two fastening portions are disposed on the frame arranged at the rear side of the pet carrier stroller.

6. The pet carrier stroller as claimed in claim 5, wherein the two sides of the front-wheel support and the two sides of the rear-wheel support are pivotally connected with two second connection parts correspondingly while two sides of the frame of the mounting frame at the front side of the pet carrier stroller and the two second connection parts are pivotally connected with two third connection parts correspondingly.

7. The pet carrier stroller as claimed in claim 4, wherein at least one object receiving portion is arranged adjacent to and above both the bottom end of the front-wheel support and the bottom end of the rear-wheel support.

8. The pet carrier stroller as claimed in claim 1, wherein the first connecting member of the seat cushion and the second connecting member of the pet carrier bag are selected from the group consisting of zippers, hook-and-loop fasteners, and male and female interlocking elements.

\* \* \* \* \*